United States Patent [19]

Herrington

[11] 4,395,221

[45] Jul. 26, 1983

[54] TUBULAR EXTRUSION APPARATUS

[75] Inventor: F. John Herrington, Holcomb, N.Y.

[73] Assignee: Mobil Oil Corporation, New York, N.Y.

[21] Appl. No.: 294,599

[22] Filed: Aug. 20, 1981

Related U.S. Application Data

[63] Continuation-in-part of Ser. No. 109,696, Jan. 4, 1980, Pat. No. 4,285,656.

[51] Int. Cl.³ ............................................... B29F 3/04
[52] U.S. Cl. ................................... 425/467; 264/514; 264/173; 264/209.8; 425/131.1; 425/326.1; 425/380; 425/462
[58] Field of Search ..................... 264/209.8, 514, 173, 264/209.1; 425/131.1, 133.1, 326.1, 380–381, 462, 467, 376 A

[56] References Cited

U.S. PATENT DOCUMENTS

| | | | |
|---|---|---|---|
| 2,239,408 | 4/1941 | Wallace | 425/113 |
| 2,766,479 | 10/1956 | Henning | 425/198 |
| 2,864,126 | 12/1958 | Henning | 425/197 |
| 2,911,676 | 11/1959 | Henning | 425/197 |
| 2,978,748 | 4/1961 | McCauley et al. | 425/467 |
| 3,221,372 | 12/1965 | Lieberman | 425/467 |
| 3,321,803 | 5/1967 | Corbett | 425/133.1 |
| 3,608,136 | 9/1971 | Tripptrap | 425/461 |
| 3,859,017 | 1/1975 | Meudec | 425/113 |
| 4,171,195 | 10/1979 | Klein et al. | 425/467 |
| 4,285,656 | 8/1981 | Herrington | 264/209.8 |

FOREIGN PATENT DOCUMENTS 2232774 1/1974 Fed. Rep. of Germany ...... 425/380

Primary Examiner—Jeffery R. Thurlow
Attorney, Agent, or Firm—C. A. Huggett; M. G. Gilman; J. F. Powers, Jr.

[57] ABSTRACT

An apparatus is provided to ensure uniform distribution of molten thermoplastic resin around a tubular die annulus upon extrusion of a thermoplastic tube. The apparatus comprises a first toroidal or partly toroidal (C-shaped) chamber surrounding the die into which the molten resin is fed from one side, and a plurality of openings through which the molten plastic flows from the first chamber into a second toroidal chamber, which feeds the die annulus. The cross-sectional area of each of the openings is gradually increased from a point adjacent the entry of the molten resin to a maximum feed opening cross-section at a point farthest removed from the resin entry point. This arrangement ensures a more uniform molten resin distribution around the die annulus during extrusion. To improve uniformity of resin distribution through the die for different resins having different flow characteristics, the openings are arranged to have as large a length as possible, preferably by being oriented axially of the die, and the length may progressively decrease from one opening to another beginning at a resin inlet. Resin stagnation is minimized by progressively decreasing the cross sectional area of the first chamber from a point closest to a resin inlet to a point farthest removed from the inlet.

12 Claims, 11 Drawing Figures

TUBULAR EXTRUSION APPARATUS

CROSS REFERENCE TO RELATED APPLICATIONS

The present application is a continuation-in-part of U.S. Ser. No. 109,696 filed Jan. 4, 1980 now U.S. Pat. No. 4,285,656 issued Aug. 25, 1981.

BACKGROUND OF THE INVENTION

1. Field of the Invention

The present invention relates to an apparatus which may be employed in the extrusion of thermoplastic materials such as thermoplastic films for packaging, and the like. More specifically, an apparatus is provided which ensures uniform molten resin flow distribution through a tubular extrusion die, which minimizes resin stagnation in the die and which minimizes sensitivity of the die to different resins.

2. Description of the Prior Art

In the prior art techniques for the extrusion of thermoplastic tubular material, solid thermoplastic resin is fed into an extrusion apparatus wherein the resin is heated and becomes molten. The molten resin is continuously mixed and forwarded to the exit end of the extruder by a rotating screw device within the confines of the extruder barrel. The molten resin is then forced through an adaptor into a tubular extrusion die, and the molten resin is expressed from the die in the form of a tube. The extruded tube is drawn from the die, usually by a pair of positively driven nip rollers, which are located downstream from the die orifice. The tubular extrusion die may be fed with molten resin either from the center of its base, i.e. center-fed, or the die may be fed through an orifice located along the side of the die, i.e. side-fed. In the case of the center-fed design, the molten thermoplastic resin from the extruder is fed into the center of the bottom of the die, where it is divided and conducted radially through channels to positions around the die annulus. Such an arrangement provides for good uniformity of resin distribution around the interior cylindrical mandrel of the die. The resin distribution in the case of a center-fed die is superior to the distribution uniformity achieved in a conventional side-fed die apparatus.

A side-fed die design is frequently required however, for various mechanical configuration considerations including cases where a tubular die must have a continuous hole in its center, for example, where a rotating shaft must extend through the die to drive a machine within the film bubble, or where several tubes must extend through the die to conduct liquid in and out of the bubble; or in the case of coextrusion wherein a plurality of thermoplastic layers are fed through the die so that they all emerge in laminar relationship through a single annular outlet orifice on the die, the latter coextrusion methods and apparatus being well known to those skilled in the art.

A conventional side-fed die has unequal path lengths, thus unequal pressure drops, for the molten resin to travel to arrive at various positions about the periphery of the die mandrel, and for this reason, it is difficult to obtain good resin distribution. Without some compensating adjustment, more resin will flow to the side of the die nearest the feed port, since it is subjected to the lowest pressure drop.

SUMMARY OF THE INVENTION

In accordance with the present invention, an apparatus has now been developed which achieves uniform molten resin distribution in a side-fed die apparatus. In a side-fed tubular die arrangement, molten thermoplastic resin is injected into the die side wall from the extruder at a single location or injection port on the side of the die. After passing into the die, the melt is fed into a first or primary toroidal-shaped chamber from which it is metered by way of a number of radial ports or openings into a second toroidal-shaped chamber. The radial ports interconnecting these two chambers are spaced apart around the circumference of the die and are conventionally uniform in cross-sectional area. In such an arrangement, the radial hole or opening which is spaced farthest away, i.e. about 180°, from the point of melt entry through the side of the die easily becomes starved. That is, at that point, considerably less molten resin is flowing into the inner chamber when compared to the amount of resin which is flowing into the inner chamber through the openings which are closest to the resin input location. As a result, the distribution of molten thermoplastic around the tubular die mandrel as the molten resin exits from the die orifice is non-uniform. In accordance with the present invention, this non-uniformity of resin distribution has now been eliminated or substantially reduced by modification of the cross-sections of the respective radial openings, whereby the cross-section of that opening which is most remote from the point of molten resin entry into the side of the die, is larger than the opening in closer proximity to the entry point of the resin. The cross-section of these radial openings or flow channels is such that they increase in cross-sectional area from the openings immediately adjacent to the melt entry to a maximum diameter at the opening positioned farthest away, e.g. 180°, from the molten resin entry point. It has been found that such an arrangement of radial openings results in a uniform distribution of the molten resin, which is fed into the inner chamber adjacent to the die mandrel, so that the resultant extruded tube has a more uniform distribution of resin about its circumference than hitherto available with prior art side-fed dies. Additionally, such an arrangement lends itself to the improved distribution of resin in multiple thermoplastic layer constructions formed during coextrusion operations, as more particularly described hereinafter. The arrangement is also applicable to a die having a toroidal-shaped or a partly toroidal shaped (C-shaped) first or primary chamber. A C-shaped primary chamber has the advantage of minimizing "dead" areas within the die where a resin may be held stagnant.

In accordance with another aspect of the invention, umiformity of resin flow through a side fed die for different resins having different flow characteristics can be improved by making the openings have as large a length as possible and, when the openings have a very large length, by progressively decreasing the length of the openings from the opening closest to the resin entry point to that which is farthest removed therefrom.

In accordance with another aspect of the invention, stagnation of resin within the first or primary chamber can be minimized by progressively decreasing the cross-sectional area of the primary chamber to maintain the resin flow velocity as the resin moves through the first chamber thereby keeping the chamber walls "scrubbed" of material.

DESCRIPTION OF SPECIFIC EMBODIMENTS

Figure 1:
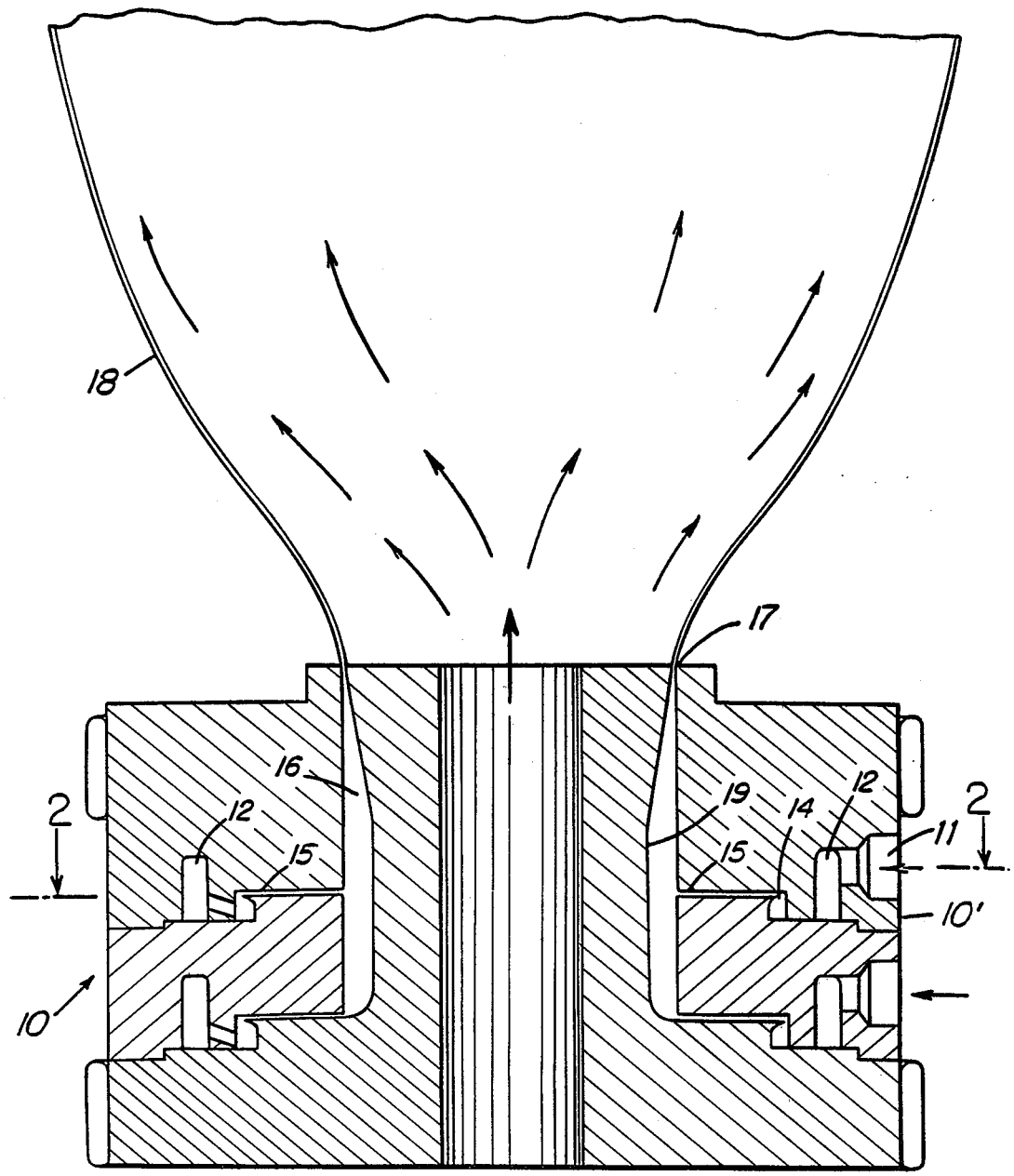
FIG. 1 is a side elevation view, in cross-section, of an embodiment of a side-fed die in accordance with the present invention.
Figure 2:
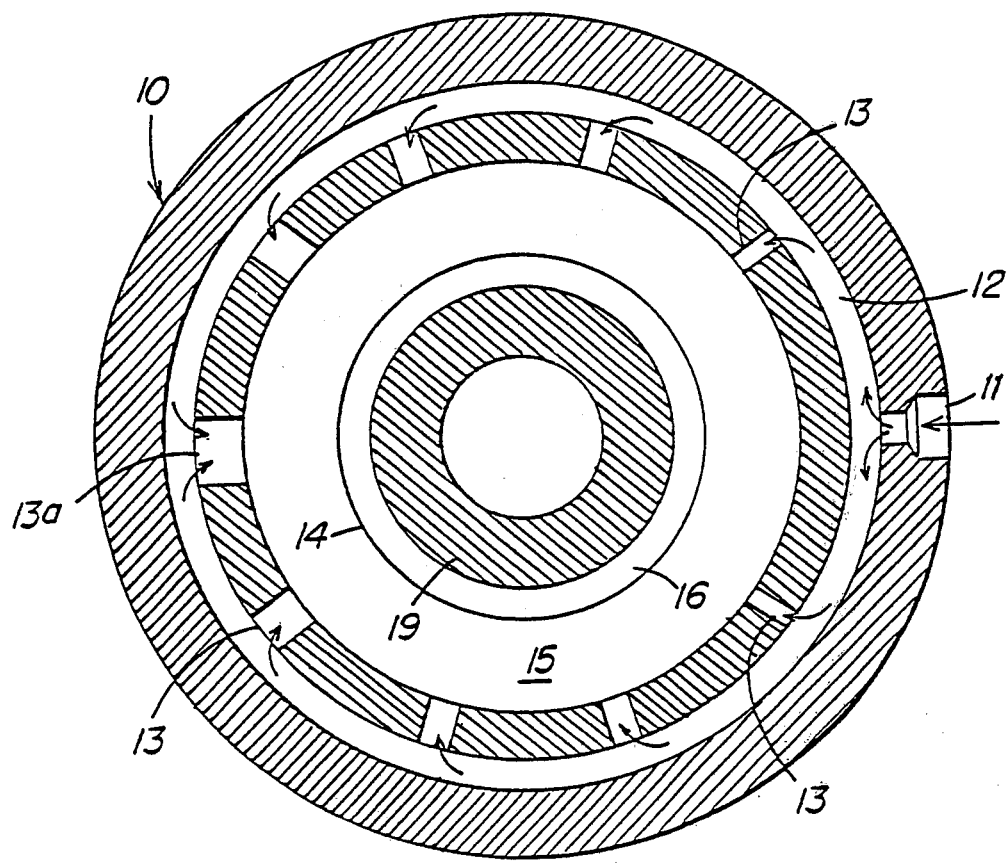
FIG. 2 is a cross-sectional view taken on line 2—2 in FIG. 1.

As shown in FIGS. 1 and 2, molten thermoplastic resin from an extruder (not shown) is fed into the side wall 10' of a tubular extrusion die 10. The embodiment illustrated in FIGS. 1 and 2 is of a tubular extrusion die designed for the extrusion of two-layer laminates. It will be understood however that in accordance with the present invention, tubular dies designed for the extrusion of monolayer films are also contemplated as well as tubular dies designed for the extrusion of multilayer laminates, i.e. having 3 or more layers.

The molten resin passes from the injection chamber 11 in the side wall 10' of die 10 into entry chamber 12 which is a torodial-shaped chamber within and encircling the outer portion of die 10. The molten resin is then passed from entry chamber 12 through openings 13 into inner chamber 14 which is a toroidal-shaped chamber encircling the inner part of die 10 and which is generally concentric with entry chamber 12.

As more clearly shown in FIG. 2, openings 13 are uniformly spaced about the wall member separating entry chamber 12 and inner chamber 14. As shown in FIG. 2, the cross-sectional area of successive openings 13 increases as the distance from injection chamber 11 increases, whereby the opening 13a, which is spaced about 180° from injection chamber 11, has the largest cross-sectional area. This variation in cross-section of openings 13 results in equal pressure drop from injection chamber 11 to the downstream end of all openings 13. For example, the pressure drop around entry chamber 12 is less for the material flowing to an opening 13 that is near injection chamber 11 than it is for material flowing to an opening 13a that is far from injection chamber 11. The diameter of openings 13 is smaller than that of opening 13a by exactly the proper amount to provide sufficient additional pressure drop such that the total drop through entry chamber plus opening is the same for all openings.

As shown in FIG. 2, the opening closest injection chamber 11 is out of axial registration therewith. This prevents the molten resin from taking a straight path through the closest opening into the second chamber, thus further ensuring a uniform extrusion.

As the molten resin leaves inner chamber 14, it passes into the metering gap 15 which uniformly meters the now uniformly distributed molten resin into extrusion chamber 16 prior to exit of the molten resinous material through die orifice 17 in the form of a continuous tube 18, which is subsequently cooled to solidify the resin and passed onto storage for further processing, e.g. bag-making operations. As a result of the uniform flow distribution achieved by the described variation in cross-sectional areas of openings 13, the molten resin is uniformly distributed about die mandrel 19 in extrusion chamber 16, and the resultant film products exhibit more uniform thickness than prior art tubular films which are extruded with openings which are uniform, i.e. without the cross-section area gradient of the present invention.

Although openings 13 have been described and illustrated as being arranged in a radial fashion between chamber 12 and 14, it will be understood that other special arrangements depending upon the specific tubular die design may be employed, such as an axial arrangement, or the like. Additionally, dependent upon die design, chambers 12 and 14 may be reversed with chamber 12 being in closer proximity to the die mandrel than chamber 14.

FIGS. 3–6 illustrate a variant to the embodiment illustrated in FIGS. 1 and 2. In FIGS. 3 through 6 elements having the same structure and functions as in FIGS. 1 and 2 have the same reference numbers. In this variant the entry chamber 29 is only partly toroidal, that is, it has a C-shape instead of being a continuous torus. Openings 13 are provided interconnecting entry chamber 29 with inner chamber 14. As in the previous embodiment, the openings 13 have cross-sectional areas which increase as the distance from the injection chamber 11 increases. A pair of openings 13b having the largest cross-sectional area are respectively provided at the ends of the C-shaped entry chamber 29. A considerable advantage of a C-shaped entry chamber over a toroidal-shaped entry chamber is the minimization of so-called "dead" area which may be present with a toroidal entry chamber. For example, if in FIG. 2 an opening were not provided at a location 180° removed from inlet chamber 11, the space in entry chamber 12 between the two adjacent openings farthest removed from inlet chamber 11 would collect and hold a melt stagnant therein. If the melt resin flowing through the die was then changed, for example, to produce a different extrusion, the collected melt resin from the previous extrusion would remain captured in the "dead" area and contaminate the new extrusion for a considerable period of time. By providing a C-shaped entry chamber 29 with openings at the respective ends thereof, no "dead" area exists at which a melt could collect and stagnate. Although illustrated with openings 13 having increasing cross-sectional areas, the C-shaped entry chamber could also be advantageously used with openings 13 having a uniform cross-sectional area as one moves along the length of the entry chamber.

Figure 3:
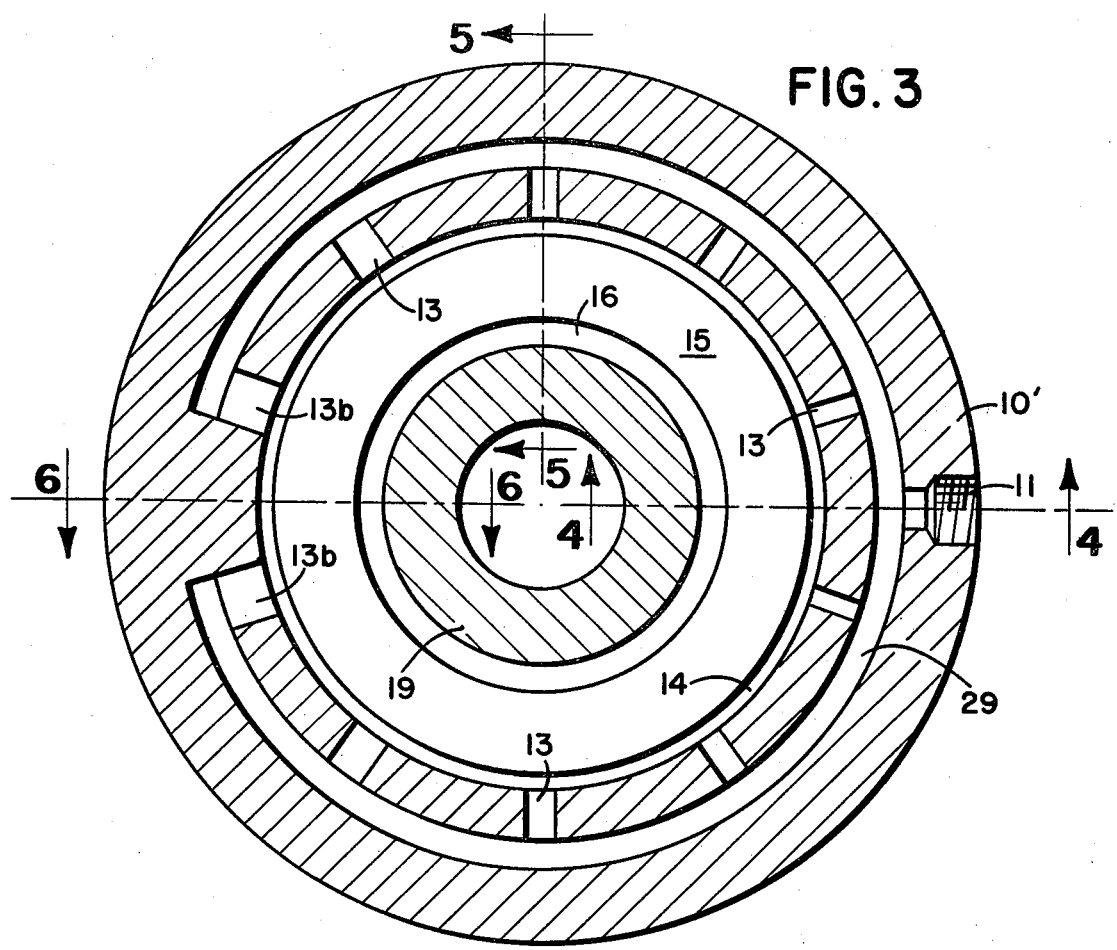
FIG. 3 is a cross-sectional view of a modification of the die illustrated in FIG. 1.
Figure 4:
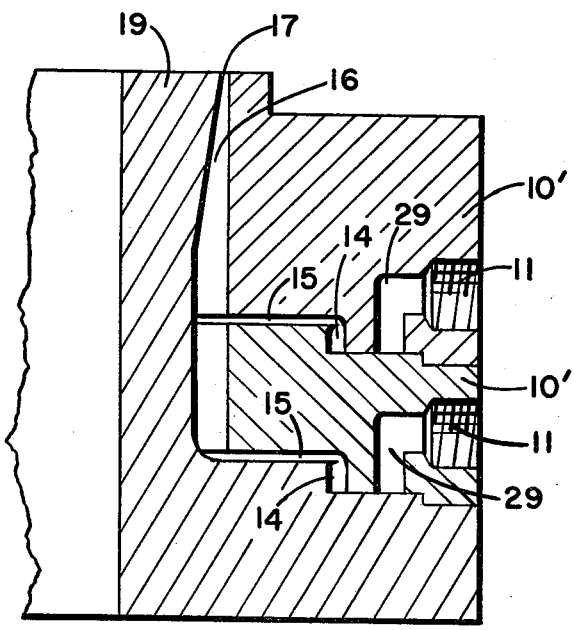
FIG. 4 is a sectional view taken along the line 4—4 in FIG. 3.
Figure 5:
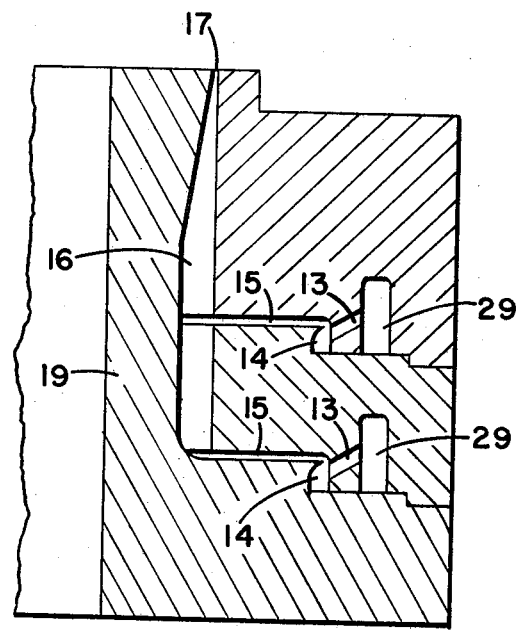
FIG. 5 is a sectional view taken along the line 5—5 in FIG. 3.
Figure 6:
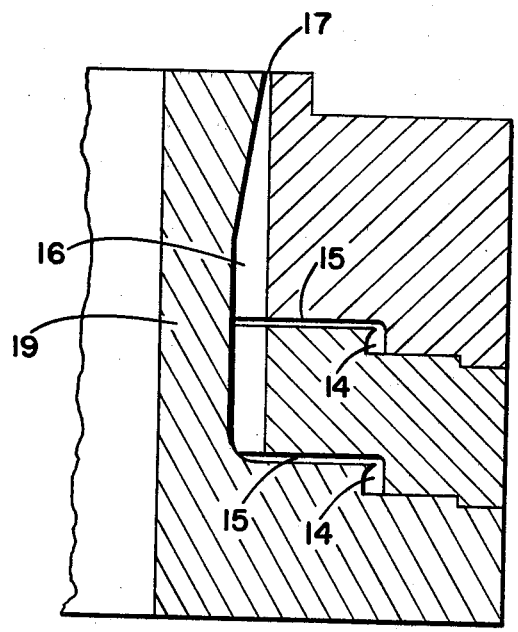
FIG. 6 is a sectional view taken along the line 6—6 in FIG. 3.
Figure 7:
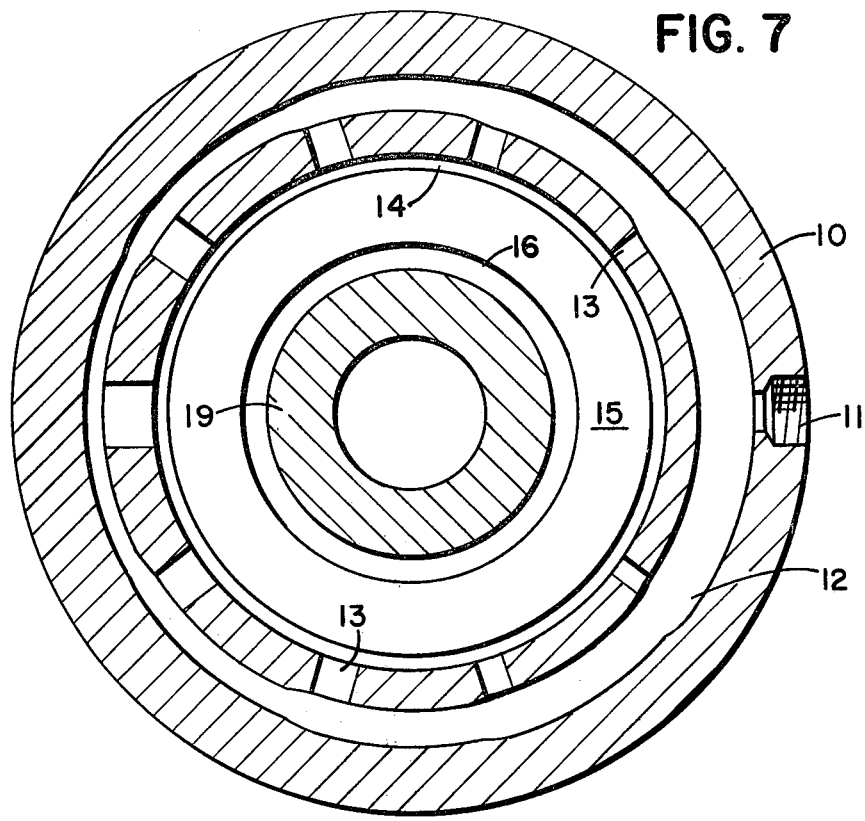
FIG. 7 is a cross-sectional view of another modification of the die illustrated in FIG. 1.
Figure 8:
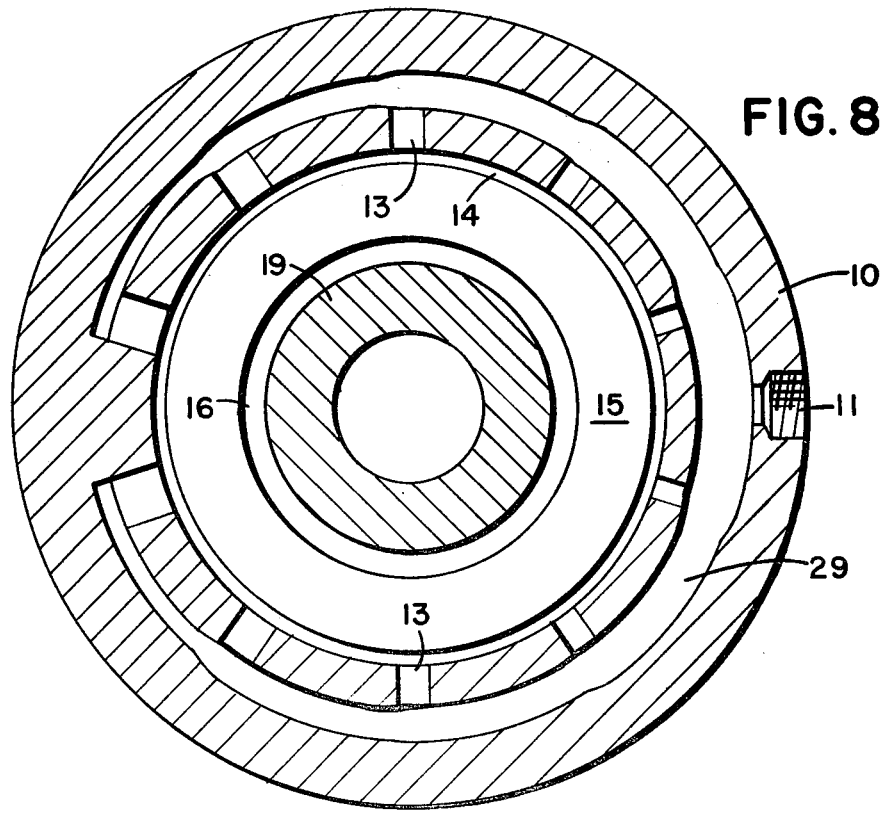
FIG. 8 is a cross-sectional view of a modification of the die illustrated in FIG. 3.

The C-shaped chamber 29 may have a continuous cross-sectional area along its length as shown in FIG. 3, or the cross-sectional area thereof preferably progressively decreases, a illustrated in FIG. 8, beginning at injection chamber 11 and ending at the ends of chamber 29. A decreasing cross-sectional area of chamber 29 further reduces problems with resin stagnation as the resin flow velocity past the walls of the chamber is maintained, thus maintaining the walls "scrubbed" of material. If the cross-sectional area of chamber 29 did not decrease the velocity of the resin would decrease as it moves along chamber 29 as a result of the diversion of resin through the openings 13. If the resin velocity becomes too low, resin stagnation will occur. Toroidal chamber 12 shown in FIGS. 1 and 2 could also be made with a continuously decreasing cross-sectional area beginning at injection chamber 11 and ending at the farthest point therefrom, as illustrated in FIG. 7, to obtain the same benefits of scrubbing the channel walls with a maintained resin flow velocity.

Although the die designs described above have a more uniform distribution of molten thermoplastic around the die annulus, it has been found that distribution uniformity of the die is, nevertheless, sensitive to a change in the extruded polymer. That is, a die constructed using the principles described above may produce a uniform distribution about the die annulus for one polymer, e.g. nylon, but when a different polymer, e.g. polyethylene, having a different flow characteristic is extruded the uniform flow distribution diminishes or disappears. Using nylon and polyethylene having respective flow exponents of 0.7 and 0.5, as examples, it has been found that a die which uniformly extrudes nylon around the die annulus will extrude a greater amount of polyethylene on the die side nearest the injection chamber 11 than on the opposite die side.

Investigation into this problem for a die constructed as shown in FIGS. 1 and 2 has revealed that uniformity of resin flow from one resin to another can be improved if (1) openings 13 interconnecting grooves 12 and 14 are made as long as possible, (2) the shear rate in an opening 13 divided by the shear rate in a chamber upstream of an opening (shear rate ratio) is as large as possible, and (3) the pressure drop through openings 13 is as low as possible (to enable the downstream metering gap 15 to exert more control over resin flow).

Unfortunately, these requirements are conflicting and also conflict with the ability to easily machine the die. Longer openings 13 cause more pressure drop. Larger diameter openings reduce the pressure drop, but also reduce the shear rate ratio. Smaller diameter openings increase the shear rate ratio, but are difficult to machine.

Figure 9:
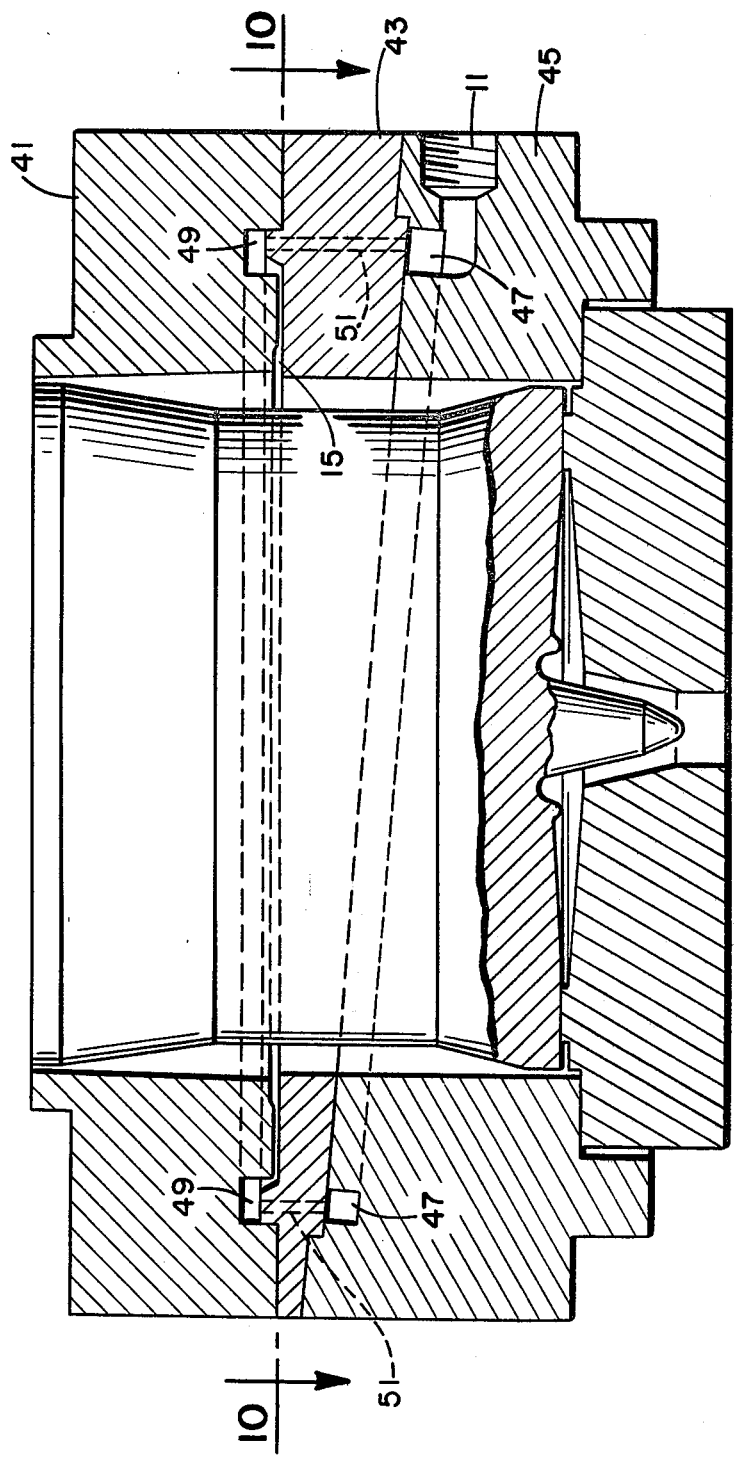
FIG. 9 is a side elevation view in cross section of another modification of the die illustrated in FIG. 1.
Figure 10:
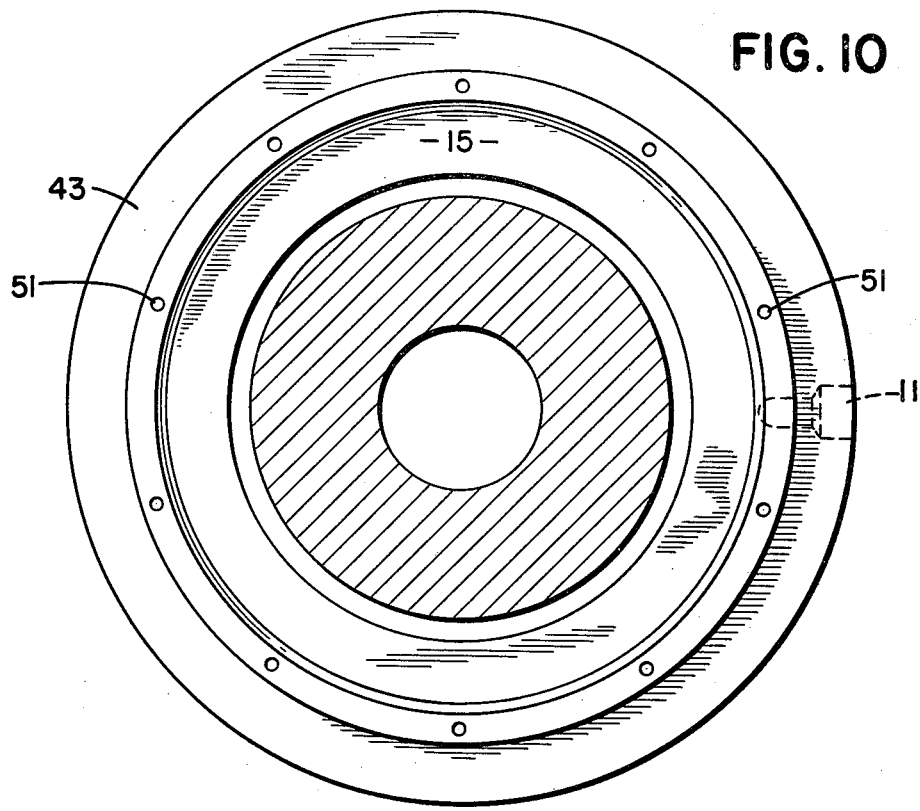
FIG. 10 is a cross-sectional view of the die illustrated in FIG. 9.

After empirical study of these conflicting requirements it was discovered that optimum results (minimum flow distribution sensitivity of the die from one polymer to another) were obtained when the openings were as long as possible. In addition, with very long openings it was found that additional improvements could be obtained if the opening length varied, progressively decreasing from an opening closest to the injection chamber 11 to an opening along chamber 12 farthest removed therefrom. FIGS. 9 and 10 show a die design which was developed in consideration of the above factors. Although the die shown is for extruding a single layer, the principles of operation are equally applicable to dies for extruding two or more layer laminates, such as those illustrated in FIGS. 1 through 6.

As shown in FIG. 9, openings 51, which interconnect a first entry chamber 47 with a second flow chamber 49 are arranged axially of the die. This arrangement allows for a greater opening length without unduly increasing die diameter. Entry chamber 47 receives molten resin from injection chamber 11. From chamber 47 the molten resin passes through openings 51 into the second chamber 49 after which it enters metering gap 15. The axial openings 15 may have a differing length as shown in FIG. 9 to provide additional improvement in distribution uniformity from resin to resin when very long openings are used. As shown, the openings 51 closest to injection chamber 11 are longer than those farthest removed therefrom.

The die sidewall is formed of three annular parts 41, 43 and 45, with part 43 being wedge shaped to provide the differing length holes 51, around the die annulus. The angle of the lower surface of part 43 will depend on the graduation in the length of openings 51 desired.

Figure 11:
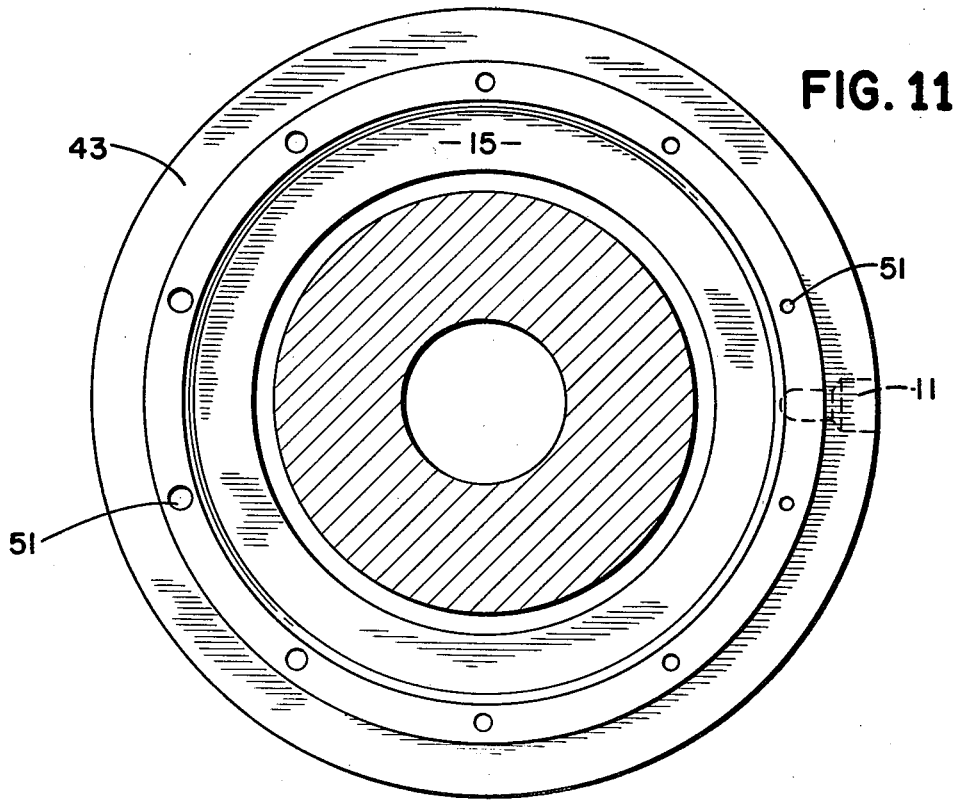
FIG. 11 is a cross-sectional view of a modification of the die illustrated in FIG. 9.

To maintain the walls of chamber 47 scrubbed of material and thereby minimized stagnation, the cross sectional area of chamber 47 progressively decreases, as shown in FIG. 9, from injection chamber 11 to a point farthest removed therefrom. As described earlier, the decreasing cross-section area maintains the resin flow velocity and the "scrubbing" effect as the resin moves farther away from injection chamber 11. The die illustrated could also be used with a chamber 47 having a uniform cross-sectional area if stagnation is not a significant problem. Although all openings 51 are shown in FIGS. 9 and 10 as having the same cross-sectional area, they can be constructed, as shown in FIG. 11, to have a cross sectional area which increases from opening to opening beginning at the opening closest to injection chamber 11 and ending with the opening farthest removed there-from. Moreover, the first chamber 47 need not be completely toroidal, as shown in FIGS. 9-11, but may be only partly toroidal, i.e. C-shaped, in the manner illustrated in FIGS. 3-6 to reduce the chance of a "dead" area being formed at a point farthest removed from injection chamber 11.

Although the present invention has been described with reference to preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:
1. A side-fed tubular extrusion die comprising:
a sidewall defining the exterior of said die, an inlet orifice in said sidewall for introducing a molten resin into said die, a first chamber located interiorly of said die in communication with said inlet orifice and extending circumferentially of said die so that the longitudinal extent of said chamber forms a C-shape, said inlet orifice communicating with said C-shaped first chamber at a point intermediate the ends thereof, said C-shaped first chamber receiving a molten resin introduced through said inlet orifice, a second toroidal-shaped chamber located interiorly of said die, an annular interior die wall separating said first and second chambers, a plurality of openings provided in and spaced along said interior die wall, said openings interconnecting said first and second chambers to allow said second chamber to receive a molten resin from said first chamber, and an extrusion gap defined by a mandrel positioned coaxially within said die and an interior die sidewall coaxial with said mandrel, said extrusion gap receiving molten resin from said second toroidal-shaped chamber.

2. A tubular extrusion die as in claim 1 wherein a pair of said openings are respectively provided at ends of said C-shaped first chamber.

3. A tubular extrusion die as in claim 1 wherein the cross-sectional area of said openings progressively increases from an opening closest to said inlet orifice to an opening farthest removed from said inlet orifice.

4. A tubular extrusion die as in claim 3 wherein a said opening closest to said inlet orifice is out of axial registration with said inlet orifice to prevent said molten resin from taking a straight path from said inlet orifice through said closest opening and into said second chamber.

5. A tubular extrusion die as in claim 1 wherein the cross-sectional area of said C-shaped first chamber progressively decreases from a point where said C-shaped first chamber communicates with said inlet orifice to the ends of said C-shaped first chamber.

6. A side-fed tubular extrusion die comprising:
a sidewall defining the exterior of said die, an inlet orifice in said sidewall for introducing a molten resin into said die, a first chamber located interiorly of said inlet orifice and extending circumferentially of said die so that the longitudinal extent of said chamber forms a C-shape, said inlet orifice communicating with said C-shaped first chamber at a point intermediate the ends thereof, said C-shaped first chamber receiving a molten resin introduced through said inlet orifice, a second toroidal-shaped chamber located interiorly of said die, an interior die wall separating said first and second chambers, a plurality of openings provided in and spaced along said interior die wall and oriented in a substantially axial direction of said die, said openings interconnecting said first and second chambers to allow said second chamber to receive a molten resin from said first chamber, and an extrusion gap defined by a mandrel positioned coaxially within said die and an interior die sidewall coaxial with said mandrel, said extrusion gap receiving molten resin from said second toroidal-shaped chamber.

7. A side-fed tubular extrusion die comprising:
a sidewall defining the exterior of said die, an inlet orifice in said sidewall for introducing a molten resin into said die, a first at least partly toroidal-shaped chamber located interiorly of said die in communication with said inlet orifice for receiving a molten resin introduced through said inlet orifice, a second toroidal-shaped chamber located interiorly of said die, an interior die wall separating said first and second chambers, a plurality of openings provided in and spaced along said interior die wall, said openings having respective lengths which progressively decrease from an opening closest to said inlet orifice to an opening farthest removed therefrom, said openings interconnecting said first and second chambers to allow said second chamber to receive a molten resin from said first chamber, and an extrusion gap defined by a mandrel positioned coaxially within said die and an interior die sidewall coaxial with said mandrel, said extrusion gap receiving molten resin from said second toroidal-shaped chamber.

8. A tubular extrusion die as in claim 7 wherein said first chamber has a longitudinal extent which forms a C-shape.

9. A tubular extrusion die as in claim 7 wherein said first chamber is in the shape of complete torus.

10. A tubular extrusion die as in claims 6 or 7 wherein the cross-sectional area of said openings progressively increases from an opening closest to said inlet orifice to an opening farthest removed from said inlet orifice.

11. A tubular extrusion die as in claim 6 wherein the length of said openings progressively decreases from an opening closest to said inlet orifice to an opening farthest removed therefrom.

12. A tubular extrusion die as in claims 6 or 7 wherein said first chamber has a cross sectional area which progressively decreases from a point thereof closest to said inlet orifice to a point farthest removed from said inlet orifice.

* * * * *